United States Patent
Jahnke et al.

(10) Patent No.: US 7,939,215 B2
(45) Date of Patent: May 10, 2011

(54) FUEL CELL SYSTEM WITH FUEL FLOW CONTROL ASSEMBLY INCLUDING A LOW FLOW BYPASS

(75) Inventors: Fred C. Jahnke, Rye, NY (US); Kirk Arneson, Danbury, CT (US); George Berntsen, Shelton, CT (US)

(73) Assignee: Fuel Energy, Inc., Danbury, CT (US)

( * ) Notice: Subject to any disclaimer, the term of this patent is extended or adjusted under 35 U.S.C. 154(b) by 1255 days.

(21) Appl. No.: 11/404,551

(22) Filed: Apr. 14, 2006

(65) Prior Publication Data

US 2007/0243434 A1 Oct. 18, 2007

(51) Int. Cl.
*H01M 8/04* (2006.01)

(52) U.S. Cl. ......... 429/442; 429/428; 429/512; 429/513

(58) Field of Classification Search .................... 429/22, 429/34

See application file for complete search history.

(56) References Cited

U.S. PATENT DOCUMENTS

| | | | |
|---|---|---|---|
| 4,965,143 A | 10/1990 | Mizuno et al. | |
| 4,968,566 A | 11/1990 | Lersch et al. | |
| 5,449,568 A | 9/1995 | Micheli et al. | |
| 2002/0022171 A1 | 2/2002 | Saito et al. | |
| 2004/0028968 A1* | 2/2004 | Okamoto | 429/23 |

* cited by examiner

*Primary Examiner* — Patrick Ryan
*Assistant Examiner* — Muhammad Siddiquee
(74) *Attorney, Agent, or Firm* — Cowan, Liebowitz & Latman, P.C.

(57) ABSTRACT

A fuel cell system with a fuel cell having an anode adapted to receive fuel and a cathode adapted to receive oxidant, an anode oxidizing assembly adapted to receive output of said anode and input oxidant and to output oxidant gas for said cathode, a fuel supply assembly including a first fuel flow control part, said fuel supply assembly being adapted to supply fuel to said anode at a flow rate that is equal to or less than a first flow rate, and a low flow bypass assembly which, upon the occurrence of a first condition of said fuel cell system, causes fuel supplied by said fuel supply part to bypass said first fuel flow control part and flow through said low flow bypass assembly so as to limit the flow rate of fuel being supplied to a second flow rate smaller than said first flow rate.

57 Claims, 4 Drawing Sheets

FUEL CELL SYSTEM WITH FUEL FLOW CONTROL ASSEMBLY INCLUDING A LOW FLOW BYPASS

BACKGROUND OF THE INVENTION

This invention relates to fuel cells and, in particular, to a fuel flow control assembly for use of fuel cells.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Molten carbonate fuel cells ("MCFC") systems operate by passing a reactant fuel gas through the anode, while oxidizing gas is passed through the cathode. Typical MCFC systems include an anode exhaust gas oxidizer unit downstream from the fuel cell anode, which comprises an oxidation catalyst for oxidizing hydrogen, carbon monoxide and unreacted hydrocarbons in the anode exhaust to produce oxidizing gas suitable for adding to the air or oxidant gas for supply to the fuel cell cathode. In some cases, the oxidizer unit is incorporated into an exhaust gas oxidizer assembly which includes a mixer preceding the oxidizer unit. In this assembly, the anode exhaust gas stream and the cathode supply air or oxidant are first mixed in the mixer and then the mixed gases are fed into the oxidizing unit for oxidizing the exhaust gas via exposure to the oxidation catalyst in the unit. The resultant gas which is rich in oxidant and carbon dioxide is then fed to the cathode of the fuel cell.

MCFC systems typically are heated to temperatures above 700 degrees F. before adding fuel, and therefore require significant start-up time in order to reach these operating temperatures. When the temperatures in the MCFC system are below 1000 degrees F., and in particular, during start-up, or heat-up, periods of the MCFC system operation, the amount of unreacted fuel in the form of methane present in the anode oxidizer assembly exhaust is significantly greater than after the MCFC system reaches its operating temperature. The presence of high methane concentration in the anode exhaust often results in incomplete oxidation of the anode exhaust gas in the oxidizing unit, allowing methane gas to slip through the oxidizing catalyst unreacted. Below 1000° F., reaction of methane and other hydrocarbons in the oxidizer is not assured. In addition, high methane concentrations and accumulation of the methane gas in the anode gas oxidizer assembly exhaust gas can potentially result in a formation of an ignitable gas mixture of significant volume, creating undesired conditions in the MCFC system.

To avoid the formation of the above-mentioned mixture in the MCFC system and the slipping of excessive unreacted methane gas through the oxidizing catalyst, the flow rate of the fuel flowing into the MCFC system needs to be accurately controlled. A common method of controlling the fuel flow rate is to employ a gas analyzer to detect excess methane in the anode gas oxidizer assembly exhaust and to control the fuel flow rate based on the detection by the analyzer so as to prevent the accumulation of methane in the anode gas oxidizer assembly exhaust and to prevent the formation of a potentially ignitable mixture. The fuel flow rate is commonly controlled using two valves downstream from the fuel supply and upstream from the fuel cell anode, wherein a first valve is sized to allow a low flow of the fuel gas therethrough and a second valve is sized to allow medium to high flow of fuel gas therethrough. Alternatively, the fuel flow rate has been controlled by varying the inlet pressure of the fuel gas flowing into the MCFC system using an automated pressure control valve. The latter method of controlling the fuel flow rate is often accomplished by setting the fuel pressure to a minimum pressure which allows the fuel flow required for full load operation of the MCFC system.

These commonly employed methods of controlling the fuel flow rate to the fuel cell anode require additional control valves and piping, as well as complex logic for controlling these valves and are susceptible to instrument or valve failure. Accordingly, the system manufacturing and operating costs are significantly increased. Moreover, the common practice of setting the fuel pressure to a minimum required pressure often results in insufficient fuel being provided to the MCFC system operating at full load, particularly when the MCFC system includes restacked fuel cell units which produce more power and require a higher fuel flow rate. Such practice, therefore, affects the operating efficiency of the MCFC system.

Accordingly, a system which effectively prevents the slipping of excess methane gas through the oxidizing catalyst and avoids formation of the undesired conditions in the MCFC system is needed. In particular, an assembly and a method for controlling a fuel flow rate to the MCFC system which is accurate, more cost-efficient and less susceptible to failure are needed. Moreover, an assembly and a method of controlling the fuel flow rate which do not adversely affect the operating efficiency of the MCFC system are also desired.

It is therefore an object of the present invention to provide a fuel cell system which is adapted such that during start-up or heat-up of the system fuel flow is controlled to avoid undesired igniting conditions of the gases of the system.

It is a further object of the invention to provide the above fuel cell system in a manner which preserves the operating efficiency of the system.

SUMMARY OF THE INVENTION

In accordance with the embodiments of the invention disclosed hereinafter, the above and other objectives are realized in a fuel cell system comprising a fuel cell having an anode adapted to receive fuel and a cathode adapted to receive oxidant gas, an anode oxidizing assembly adapted to receive output of the anode and input oxidant and to output oxidant gas to the cathode, a fuel supply assembly including a first fuel flow control part, the fuel supply assembly being adapted to supply fuel to the anode at a flow rate that is equal to or less than a first flow rate, and a low flow bypass assembly which, upon the occurrence of a first condition of the fuel cell system, causes fuel being supplied by the fuel supply assembly to bypass the first fuel flow control part and to pass through the low flow bypass assembly so as to limit the fuel flow rate of fuel being supplied by the fuel supply assembly to a second flow rate smaller than the first flow rate. A control assembly may be further provided and is responsive to the fuel cell system including the first condition of the system for controlling the fuel supply assembly and the low flow bypass assembly to effect the bypass operation. In the illustrative embodiments, the first condition of the fuel cell system that brings about the bypass operation is when the operating temperature in the anode oxidizing assembly is within a predetermined temperature range.

In certain embodiments, the fuel supply assembly includes a supply line, with the first fuel flow control part formed by a fuel flow block valve that controls the on/off flow of fuel through the supply line, and the low flow bypass assembly includes a bypass line having a first end coupled with the fuel supply line upstream from the fuel flow block valve and a second end coupled with the fuel supply line downstream from the fuel flow block valve, and a low flow bypass control part for controlling the flow of fuel through the bypass line. The low flow bypass control part may be in the form of a low flow bypass block valve for controlling the on/off flow through the bypass line followed by a flow limiting part for limiting the fuel flow rate to the second fuel flow rate.

The control assembly of the fuel cell system controls the fuel flow block valve to close and the low flow bypass block valve to open when the temperature in the oxidizing assembly is within the predetermined temperature range. When the temperature in the oxidizing assembly is below the lower limit of the predetermined temperature range no fuel is delivered to the supply line. When the temperature in the oxidizing assembly is within the predetermined temperature range, the control assembly controls the low flow bypass block valve to open and fuel flow block valve to close. When the temperature in the oxidizing assembly is above the upper limit of the predetermined temperature range, the control assembly controls the low flow bypass block valve to close and the fuel flow block valve to open. In certain embodiments, the oxidizing assembly includes an oxidizing catalyst for oxidizing the anode output and the input oxidant received by the oxidizing assembly. In such embodiments, the control assembly controls the fuel flow block valve to close and the low flow bypass block valve to open if the temperature in the oxidizing catalyst is within the predetermined temperature range.

In some illustrative embodiments, the fuel cell system also includes a heating unit downstream from the first fuel control part for heating the fuel to a preselected temperature, which receives fuel from the supply line and outputs heated fuel. The fuel cell system may further include a fuel processing assembly downstream from the heating unit for processing heated fuel output from the heating unit and outputting processed fuel for the fuel cell anode. In some illustrative embodiments, the fuel cell system also includes a heating bypass assembly which, upon the occurrence of one or more second and third conditions of the fuel cell system, causes fuel being supplied by the fuel supply assembly to bypass the fuel flow block valve and the heating unit for supply to the fuel cell. The control assembly is also responsive to the second and third conditions of the fuel cell system and controls the heating bypass assembly in addition to controlling the fuel supply assembly and the low flow bypass assembly. In the illustrative embodiments disclosed, the control assembly controls the heating bypass assembly to effect its bypass operation when the temperature in the oxidizing assembly exceeds the predetermined temperature range (is greater than the upper limit of the predetermined temperature range), i.e., the second condition, and the fuel cell system is operating at a power level greater than a predetermined power level, i.e., the third condition.

The heating bypass assembly comprises a heating bypass line, having a first end coupled with the supply line upstream from the fuel flow block valve and a second end coupled with a further supply line downstream from the heating unit and upstream from the processing assembly, if a processing assembly is used, and a heating bypass control part in the form of a heating bypass block valve which controls the on/off fuel flow through the heating bypass line. In particular, when the temperature in the oxidizing assembly is within the predetermined temperature range (first condition), the control assembly controls the low flow bypass block valve to open and the fuel flow block valve and the heating bypass block valve to close, and when the temperature in the oxidizing assembly is greater than the upper limit of the predetermined temperature range (second condition) and the fuel cell system is operating at a power level greater than the predetermined power level (third condition), then the control assembly controls the heating bypass block valve to open and the low flow bypass block valve to close. In the illustrative embodiments described herein, the predetermined temperature range, first flow rate, second flow rate and predetermined power level used are typical parameters for molten carbonate fuels cells of about 700 to 1000 degrees F. for the predetermined temperature range, about 55 scfm or less for the first flow rate, about 4 scfm or less for the second flow rate, and about 45 kW for the predetermined power level. Methods of operating the above fuel cell system are also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
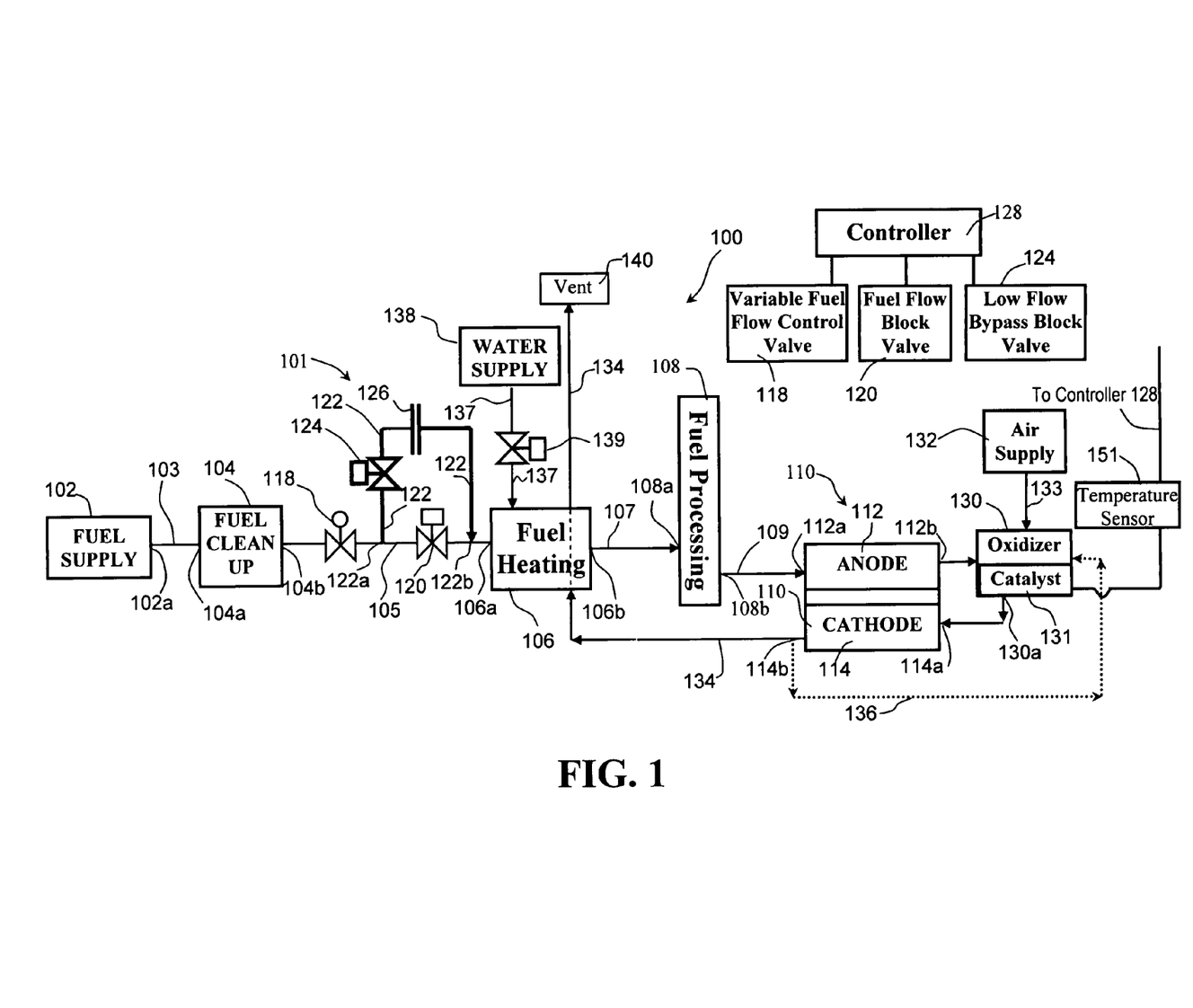
FIG. 1 shows a MCFC system employing a low flow bypass assembly.

FIG. 1 shows a fuel cell system 100 employing a low flow bypass assembly 101. The fuel cell system 100 also includes a fuel inlet 102a for supplying fuel in gaseous or other form from a fuel supply 102 to the system 100, a fuel clean-up assembly 104 for removing a variety of contaminants from the fuel, such as sulfur-containing compounds, a fuel processing assembly 108 for processing fuel gas, and a fuel cell 110 comprising an anode 112 and a cathode 114. It is understood that the fuel clean-up assembly 104 may include a plurality of units for removal of contaminants, including, but not limited to, one or more desulfurizing units. Likewise, the fuel processing assembly 108 may include a plurality of units for processing fuel gas before it enters the anode 112, including, but not limited to, one or more reforming units. In the illustrative arrangement shown in FIG. 1, the fuel cell system 100 also includes a heating unit 106 downstream from the fuel clean-up assembly 104 for pre-heating the fuel to a desired temperature before the fuel is passed to the fuel processing assembly 108.

In certain forms of the invention and in the illustrative form of the invention discussed herein, the fuel cell 110 is a molten carbonate fuel cell which typically operates at temperature of 1200 degrees F. However, the fuel cell 110 may be any other type of fuel cell. For example, the fuel cell 110 may be a high temperature solid oxide fuel cell.

As shown, the fuel inlet 102a is coupled with an inlet 104a of the fuel clean-up assembly 104 by a connecting line 103, and an outlet 104b of the fuel clean-up assembly 104 is coupled by a connecting line 105, also referred to as a fuel supply line, with an inlet 106a of the heating unit 106. The connecting line 105 has disposed therein a first fuel flow control part formed as fuel flow block valve for controlling the on/off flow of fuel through the connecting line 105, and a second fuel flow control part in the form of variable fuel flow control valve 118 upstream from the first valve 120 for controlling the flow rate of fuel in the supply line. A solenoid valve is suitable for use as the fuel flow block valve 120.

As also shown, the heating unit 106 receives fuel via the fuel supply line 105 through an inlet 106a, and water from a water supply 138 through a connecting line 137. In the heating unit 106, the fuel is mixed with the water from the water supply 138 and heated to a desired pre-selected temperature. An outlet 106b of the heating unit 106 is coupled with an inlet 108a of the fuel processing assembly 108 by a connecting line 107, and an outlet 108b of the fuel processing assembly 108 is, in turn, coupled with an inlet 112a of the anode 112 by a connecting line 109.

As further shown in FIG. 1, fuel inputted into the anode 112 through the anode inlet 112a reacts with oxidant gas inputted into the cathode 114 in the fuel cell 110, and anode exhaust gas comprising unreacted fuel is passed through an anode outlet 112b to an anode exhaust oxidizing assembly 130. The anode exhaust oxidizing assembly 130 also receives input oxidant gas comprising oxygen from an air supply 132 via a supply line 133. In the oxidizing assembly 130, unreacted fuel components of the anode exhaust gas, including hydrogen, hydrocarbons such as methane and carbon monoxide, are mixed with the input oxidant gas and oxidized to produce a mixture of carbon dioxide and air.

In the illustrative arrangement shown, the oxidizing assembly 130 includes an oxidizing catalyst 131, which is used to facilitate the oxidation reaction between the unreacted fuel components and the oxidant gas. The mixture of carbon dioxide and air produced in the oxidizing assembly 130 is suitable for use as the oxidizing gas in the fuel cell cathode 114, and as shown, an outlet 130a of the oxidizing assembly 130 is coupled with an inlet 114a of the cathode 114. An outlet 114b of the cathode can, in turn, be coupled with the heating unit 106 via a connecting line 134 so that the heated oxidant exhaust gas is used to heat the fuel gas passing through the heating unit 106, before being directed to a vent 140. In some illustrative embodiments, the cathode outlet 114b is coupled with the oxidizing assembly 130 via a connecting line 136 so that part of the oxidant exhaust gas is used to supplement the oxidant gas from the oxidant gas supply. In the arrangements in which part of the depleted oxidant gas is directed to the oxidizing assembly 130 via the line 136, a control part, such as a valve or variable speed blower, can be used to control the depleted oxidant gas to be directed through the line 136 and/or through the line 134.

The low flow bypass assembly 101 will now be described in more detail with reference to FIG. 1. As shown, the low flow bypass assembly 101 is coupled with the fuel supply line 105 and is used for passing the fuel around the first fuel flow control part or the block valve 120 so as to limit the flow of fuel to a predetermined maximum flow rate. In this illustrative embodiment, the low flow bypass assembly 101 includes a bypass line 122, a low flow bypass control part formed to include low flow bypass block valve 124 for controlling the on/off flow through the bypass line followed by a flow limiting part 126 for limiting the fuel flow rate through the bypass line, and a controller 128. The flow limiting part 126, which may be in the form of an orifice member, is adapted to control the fuel flow rate through the bypass line 122 such that the flow rate does not exceed the predetermined flow rate. As shown, the bypass line 122 includes a first end 122a coupled with the fuel supply line 105 downstream from the fuel flow control valve 118 and upstream from the fuel flow block valve 120. A second end 122b of the bypass line 122 is coupled with the fuel supply line 105 downstream from the fuel flow block valve 120 and upstream from the heating unit 106. The low flow bypass block valve 124 is disposed on the bypass line 122 upstream from the flow limiting part 126.

The operation of the low flow bypass assembly 101 is controlled by the controller 128 as described in more detail herein below, such that the low flow bypass block valve 124 is open and the block valve 120 is closed when a low fuel flow rate is desired, and the low flow bypass block valve 124 is closed and the block valve 120 is open when a high fuel flow rate is desired. The low fuel flow rate in this illustrative embodiment is limited to 4 scfm and is preferably 3 scfm or less, while the high fuel flow rate is 3 scfm or higher. In certain illustrative arrangements, the low fuel flow rate is between 1.5 and 3 scfm, while the high fuel flow rate is between 3 and 55 scfm.

The low fuel flow rate is desired when to prevent an excessive amount of unreacted fuel to be present in the anode oxidizer assembly exhaust gas due to incomplete reaction of the fuel in the anode 112 and the oxidizer assembly 130, thereby creating a potentially ignitable gas mixture. Such conditions typically occur when the operating temperature of the fuel cell 110 and thus the anode oxidizer assembly 130 and its catalyst 131 is within a predetermined temperature range whose lower limit is a temperature at which fuel begins to be supplied to the fuel supply line 103 (typically a temperature of about 700 degrees F. for a molten carbonate fuel cell system) and whose upper limit is at a temperature at which the fuel cell 110 and anode oxidizer assembly 130 and its catalyst 131 are operative to the point that the anode oxidizer assembly exhaust contains unreacted fuel in an amount which is less than that able to potentially cause an ignitable condition (typically a temperature of about 1000 degrees F. for a molten carbonate fuel cell system).

The temperature of the oxidizing catalyst 131 and, therefore, the anode oxidizing assembly 130 and, thus the fuel cell 110 may be detected by a suitable temperature sensor 151 responsive to the catalyst temperature. The sensor output is then coupled to the controller 128 so that the controller can then respond to this temperature.

As shown in FIG. 1, when the controller 128 controls the fuel flow block valve 120 to close and the low flow bypass block valve 124 to open, the fuel is directed to flow through the low flow bypass assembly 101 and around the block valve 120, and the fuel flow rate is controlled by the flow limiting part 126 of the assembly 101 and by the variable control valve 118. In this illustrative example, the limiting part 126 of the low flow bypass assembly 101 is an orifice member which limits the flow rate of fuel to a maximum of 4 scfm when the variable fuel flow control valve 118 is fully or 100% open. Limiting the flow of fuel to a maximum rate of 4 scfm limits the amount of fuel that is delivered to the fuel cell anode 112, which, in turn, limits the amount of unreacted fuel present in the anode exhaust gas and anode gas oxidizer assembly exhaust gas. The use of the low flow bypass assembly 101 thus prevents the formation of an ignitable gas mixture containing excess unreacted fuel from the anode exhaust, and allows more accurate control of the fuel flow rate to the anode. As mentioned herein above, the presence of the low flow bypass assembly 101 and the limiting part 126 allows the fuel flow rate to be accurately controlled to be in the range of 1.5 to 3 scfm using the variable control valve 118.

Moreover, to further ensure that an ignitable mixture is not formed in the anode oxidizer assembly exhaust, a sufficient amount of input oxidant gas is required to be inputted to the oxidizing assembly 130. In particular, the supply of input oxidant gas is controlled such that the oxidant gas is supplied from the air supply 132 to the oxidizing assembly 130 with a sufficient flow rate. The controller 128 shown in FIG. 1, or a separate controller (not shown), may be employed to control the flow rate of the oxidant gas to the oxidizing assembly 130. In an alternative illustrative embodiment, the flow rate of the oxidant gas may be pre-set to a predetermined oxidant flow rate. For example, the predetermined oxidant flow rate of 200 scfm or higher is sufficient to dilute the unreacted fuel in the anode exhaust supplied to the oxidizing assembly 130 so that the resulting mixture has safe levels of methane. In such cases, an acceptable and safe level of methane is about 2% when the lower ignitable limit is 4%.

Figure 2:
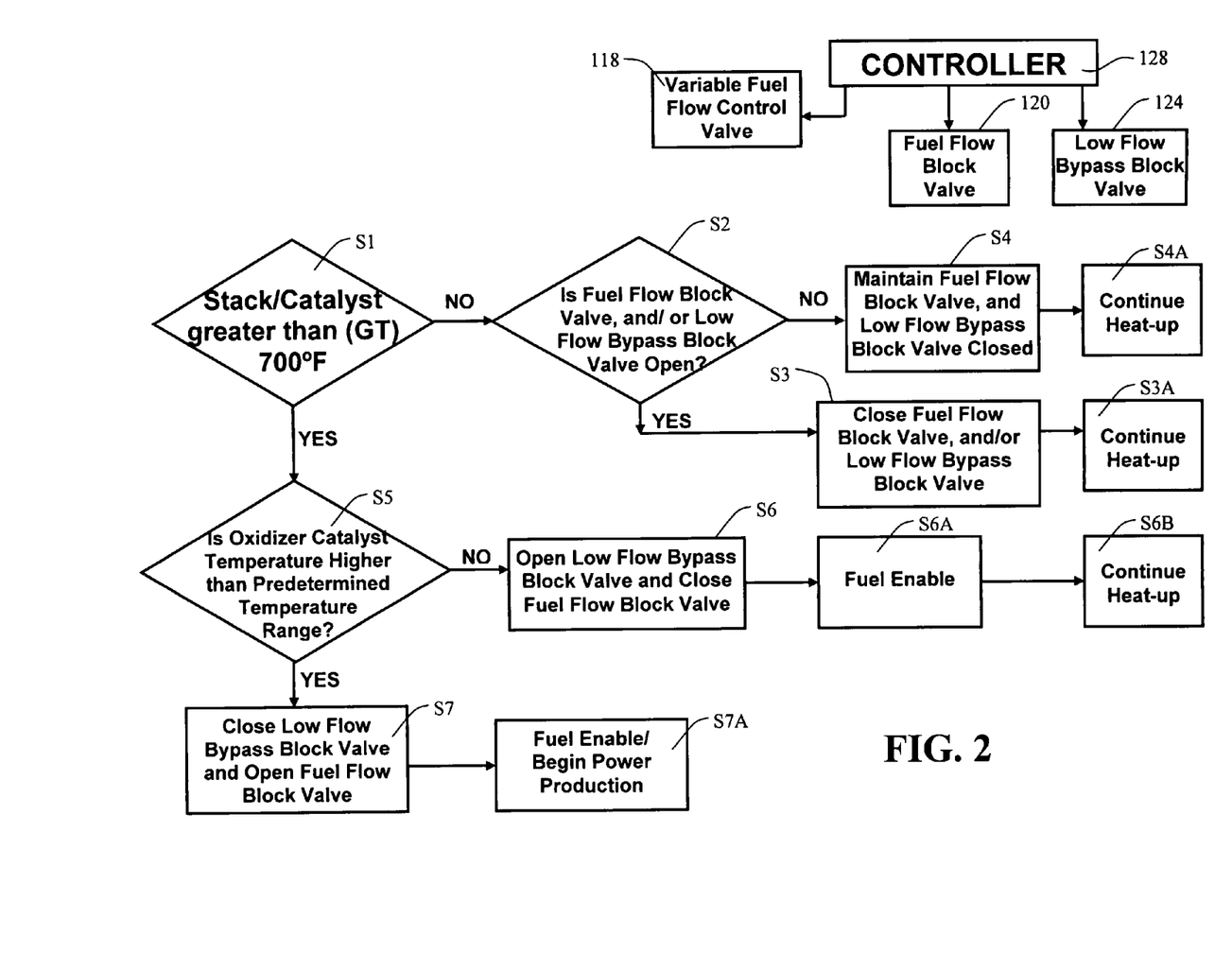
FIG. 2 shows a flow diagram of the logic operations for controlling the MCFC system of FIG. 1.

The control of the operation of the low flow bypass assembly 101 of FIG. 1 by the controller 128 is shown in more detail in FIG. 2. As shown in FIG. 2, in a first step S1, the controller 128 determines whether supply of fuel to the fuel cell system 100 should be enabled. This can be accomplished by determining whether the temperature of the oxidizing catalyst 131 (and therefore the anode oxidizing assembly 130 and the fuel cell 110) has reached the lower limit of the above-mentioned predetermined temperature range (about 700 degrees F. for a molten carbonate fuel cell system) via the signal from the sensor 151. If the controller 128 determines in the first step S1 that the lower temperature limit has not been reached and, therefore, that the supply of fuel has not been enabled, the controller's operation proceeds to a second step S2 in which it determines whether at least one of the fuel flow block valve 120 and the low flow bypass block valve 124 is open. If the controller 128 determines that at least one of the fuel flow block valve 120 and the low flow bypass block valve 124 is open, the controller 128 causes each of such open valves 120 and/or 124 to close and maintains each of these valves 120 and/or 124 in a closed state in a third step S3 and then proceeds with heat up in a further step S3A. If the controller determines that neither the fuel flow block valve 120 nor the low flow bypass block valve 124 is open, then the controller 128 maintains the fuel flow block valve 120 and the low flow bypass block valve 124 in a closed state in step S4 and then proceeds with heat up in a further step S4A.

Referring back to the first step S1 of the controller's operation, if the controller 128 determines in step S1 that the supply of fuel to the system should be enabled, then the controller operation proceeds to step S5, in which the controller determines via the sensor 151 whether the temperature in the oxidizing catalyst 131 (and therefore the oxidizing assembly 130 and the fuel cell 110) remains in the predetermined temperature range, i.e., has the temperature exceeded the upper limit of the predetermined temperature range (about 1000 degrees F. for a molten carbonate fuel cell). If the temperature is within the predetermined range, the potential for the formation of an ignitable fuel mixture in the anode oxidizer assembly exhaust is present and low flow bypass operation is necessary. If the temperature is above the range then the potential for an ignitable mixture is no longer present and low flow bypass operation is unnecessary.

Accordingly, if it is determined in step S5 that the temperature of the oxidizing catalyst 131 has not exceeded the upper limit of the predetermined temperature range, then the controller operation proceeds to step S6 in which the controller 128 causes the fuel flow block valve 120 to close, or maintains the block valve 120 in a closed state, and opens the low flow bypass block valve 124, or maintains the low flow bypass block valve 124 in an open state, and opens the fuel flow control valve 118, or maintains the fuel flow control valve in open state. Fuel supplied to the system 100 is thus directed through the low flow bypass assembly 101 instead of the fuel flow block valve 120. With bypass flow in operation, fuel enable to the fuel cell in step S6A and continued heat up of the fuel cell in step S6B then occur. However, the fuel flow rate is limited by the low flow bypass assembly 101, and in particular, by the flow limiting part 126 of the low flow bypass assembly 101, to a predetermined flow rate, such as, for example, to a flow rate of 4 scfm or less.

If, on the other hand, the controller determines in step S5 that the temperature of the oxidizing catalyst exceeds the upper limit of the predetermined temperature range, then the controller proceeds to step S7. In step S7, the controller 128 causes the low flow bypass block valve 124 to close, or maintains the low flow bypass block valve 124 in a closed state, opens the fuel flow block valve 120, or maintains the block valve 120 in an open state. This operation prevents the fuel from flowing through the low flow bypass assembly 101, and causes the fuel to flow under control of the fuel control valve 118 through the block valve 120 and then through the remainder of the system to the fuel cell for power production in step S7A.

Figure 3:
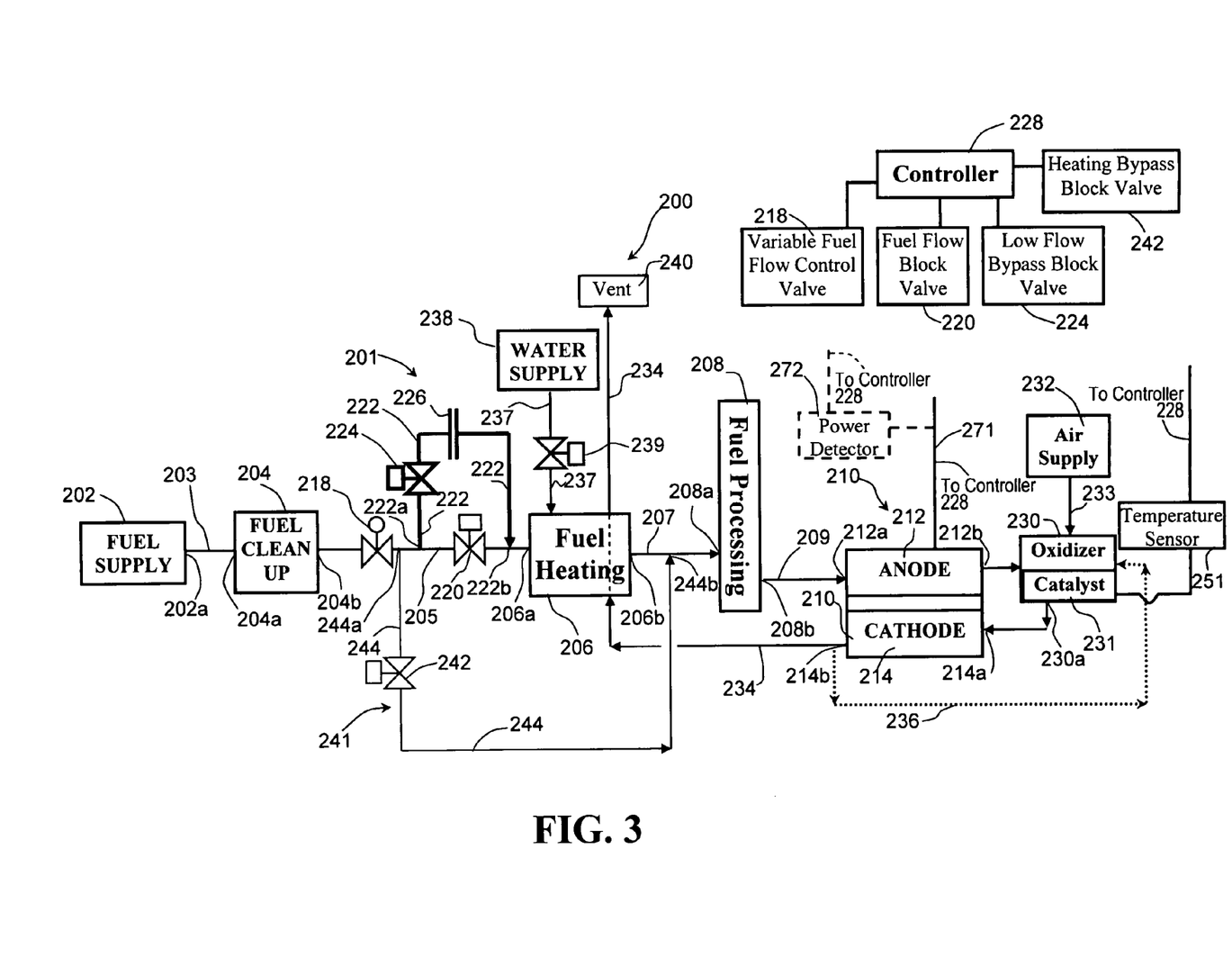
FIG. 3 shows another embodiment of a MCFC system employing a low flow bypass assembly and a heating bypass assembly.

FIG. 3 shows an alternative embodiment of the fuel cell system 200 employing the low flow bypass assembly 201 and a heating bypass assembly 241. The fuel cell system 200 shown in FIG. 3 has a similar construction as the fuel cell system 100 shown in FIG. 1, and includes similar components as the system 100 of FIG. 1. In particular, the fuel cell system 200 includes a fuel cleanup unit 204 which receives fuel from a fuel supply 202 via a connecting line 203, a fuel heating unit 206 adapted to receive fuel from the fuel cleanup unit 204 via a connecting line, also referred to as a fuel supply line, 205 and water from a water supply 238 via a connecting line 237 and to heat the mixture of fuel and water to a desired temperature, a fuel processing unit 208 which receives fuel from the heating unit 206 via a connecting line 207 and outputs processed fuel to an anode 212 of a fuel cell 210 via a connecting line 209.

The fuel cell system 200 of FIG. 2 also includes an oxidizing assembly 230, including an oxidizing catalyst 231, for oxidizing a mixture of anode exhaust gas outputted by the fuel cell anode and input oxidizing gas from an air supply 232 to produce oxidizing gas suitable for use in a cathode 214 of the fuel cell 210. The system 200 further includes a first fuel flow control part formed as fuel flow block valve 220 for controlling the on/off flow through the connecting line 205, a second fuel flow control part in the form of a variable fuel flow control valve 218 disposed on the connecting line 205 downstream from the fuel cleanup 204 and upstream from the block valve 220, a low flow bypass assembly 201, which includes a bypass line 222, a low flow bypass control part formed to include a low flow bypass block valve 224 for controlling the on/off flow through the bypass line 222 and a flow limiting part 226 for limiting the flow rate through the bypass line, and a controller 228 for controlling the operation of the variable fuel flow control valve 218, the fuel flow block valve 220 and the low flow bypass block valve 224 of the low flow bypass assembly 201.

As shown, the bypass line 222 of the low flow bypass assembly includes a first end 222a coupled with the fuel supply line 205 downstream from the variable fuel flow control valve 218 and upstream from the fuel flow block valve 220, and a second end 222b coupled with the fuel supply line 205 downstream from the fuel flow block valve 220 and upstream from the heating unit 206. Also, the fuel flow limiting part 226 of the low flow bypass assembly is disposed on the bypass line 222 downstream from the low flow bypass block valve 224.

A sensor 251 reports the temperature of the oxidizing catalyst 231 and, therefore, the anode oxidizing assembly 230 and the fuel cell 210, to the controller 228. As can be seen, these components of the fuel cell system 200, and the arrangement and operation thereof, are similar to the components of the fuel cell system 100 shown in FIG. 1, and therefore a detailed description these components and their operation is omitted.

In the illustrative embodiment shown in FIG. 3, the fuel cell system 200 also includes a fuel heating bypass assembly 241 for bypassing part or all of the fuel around the heating unit 206 when the fuel cell system operates at predetermined conditions. As shown, the heating bypass assembly 241 comprises a heating bypass line 244 having a first-end, or inlet, 244a coupled with the fuel supply line 205 downstream from the variable fuel flow control valve 218 and upstream from the first end 222a of the low flow bypass line 222, and a second end, or outlet, 244b coupled with the fuel supply line 207 downstream from the heating unit 206 and upstream from the fuel processing unit 208. The heating bypass assembly 241 also includes a heating bypass control part in the form of a heating bypass block valve 242 which controls the on/off fuel flow through the bypass line 244. As shown in FIG. 3, the heating bypass block valve 242 is disposed in the bypass line 244, and is open when part or all of the fuel is being directed through the heating bypass assembly 241 and closed when all of the fuel is being directed through the fuel supply line 205 to the heating unit 206 or through the low flow bypass assembly 201.

The controller 228 of the fuel cell system 200, in addition to controlling the operation of the low flow bypass assembly 201 and the block and variable valves 220, 218, also controls the heating bypass assembly 241. As discussed above, the controller 228 may also control the supply of input oxidant gas from the air supply 232 to the oxidizing assembly 230, or, in certain embodiments, a predetermined oxidant flow rate or a minimum oxidant flow rate, such as 200 scfm, can be pre-set to ensure sufficient supply of input oxidant gas to the oxidizing assembly 230.

In particular, the heating bypass block valve 242 is controlled by the controller 228 to close when the fuel is being directed through the variable fuel control valve 218 and through low flow bypass assembly 201. This occurs, as discussed above, when the temperature of the oxidizing catalyst 231 (and therefore the anode oxidizing assembly 230 and fuel cell 210) is within the predetermined temperature range (typically about 700 to 1000 degrees F. for a molten carbonate fuel cell system, as also discussed above). The closed condition of the heating bypass block valve 242 is maintained by the controller 218 until one or more other predetermined operating conditions occur. In the present illustrative embodiment, the one or more other predetermined conditions include the condition of the anode oxidizing catalyst (and therefore the anode oxidizing assembly 230 and fuel cell 210) operating at a temperature above the upper limit of the predetermined temperature range (above about 1000 degrees for the above-mentioned temperature range) and the fuel cell 210 operating at a power level which exceeds a predetermined power level (e.g., 45 kW for a molten carbonate fuel cell whose normal operating power level is about 300 kW). The power level of the of the fuel cell 210 can be determined, for example, by reporting the current and voltage output on line 271 of the fuel cell 210 to the controller 228 directly or after passage through power conditioning and/or converting equipment (not shown), or via a power detector 272 monitoring the line or the equipment.

Thus, when the temperature of the oxidizing catalyst of the oxidizing assembly 230 exceeds the upper limit of the predetermined temperature range and the fuel cell 210 operates at a power level that is greater than the predetermined power level, the controller 228 controls the low flow bypass block valve 224 to close, or to remain in a closed state, and the heating bypass block valve 242 to open so that part or all of the fuel is directed through the heating bypass line 244 around the heating unit 206. Typically the first fuel flow block valve 220 will be opened or remain open so that only part of the fuel bypasses the heating unit 206. Note that the amount of bypass is typically set by hand valves (not shown) when the unit is first installed in order to optimize the temperature of the fuel to the fuel processing unit for the specific fuel composition of the unit. By passing part or all of the fuel directly to the fuel processing assembly 208 without pre-heating the fuel in the heating unit 206, the temperature of the fuel can be more accurately controlled during the high power operation of the fuel cell 210.

Figure 4:
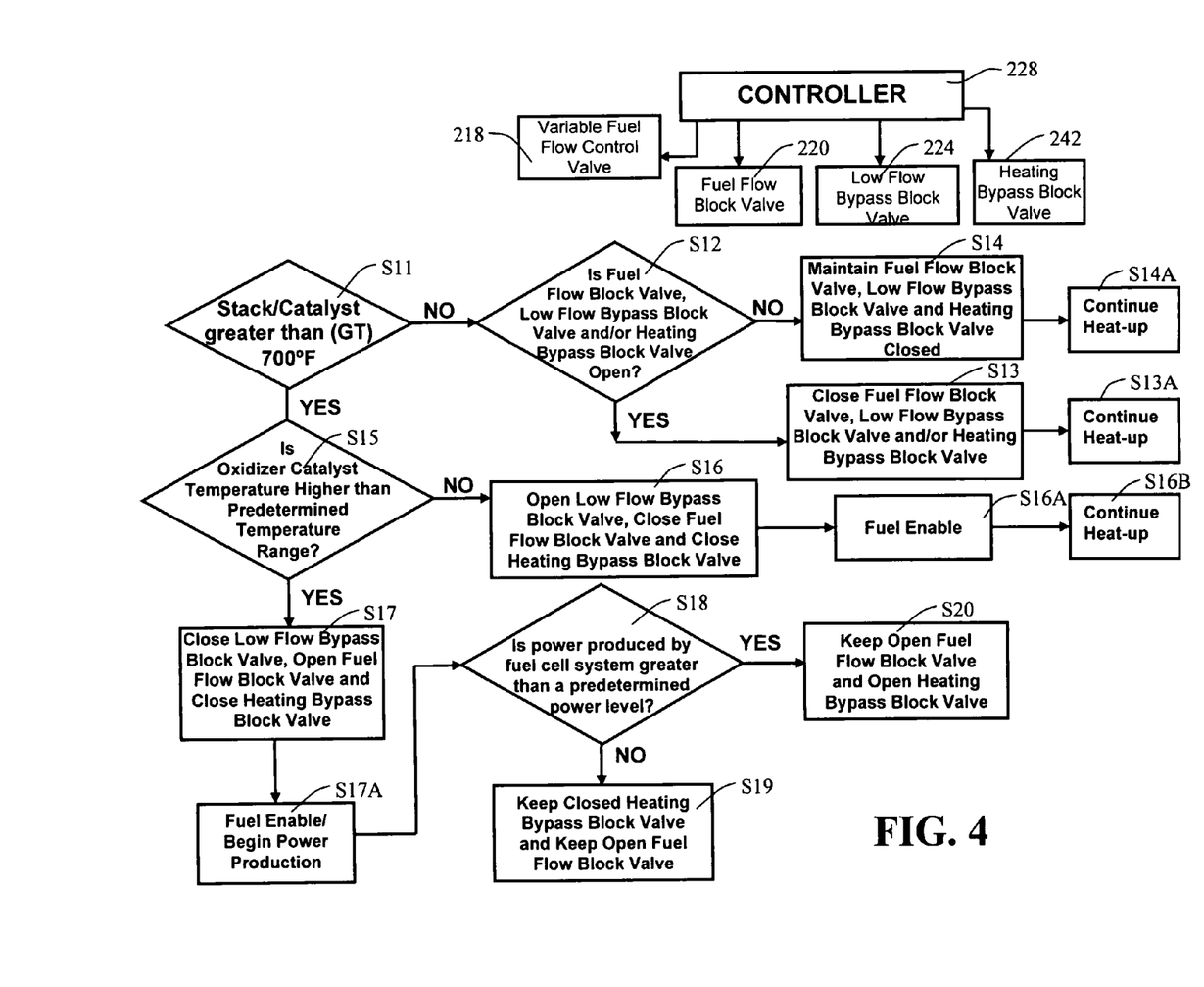
FIG. 4 shows a flow diagram of the logic operations for controlling the MCFC system of FIG. 3.

The operation and control of the low flow bypass assembly 201 and the heating bypass assembly 241 by the controller 228 are shown in more detail in FIG. 4. As shown in FIG. 4, the controller 228 controls the opening and closing of the variable fuel flow control valve 218, the fuel flow block valve 220, the low flow bypass block valve 224 and the heating bypass block valve 242. The operation of the controller 228 begins with a determination in a first step S1 whether the flow of fuel from the fuel supply should be enabled. In particular, the controller 228 determines in the first step S11 whether oxidizing catalyst 231 (and therefore the oxidizing catalyst assembly 230 and fuel cell 210) has been heated to the lower limit of the predetermined temperature range at which point fuel flow is enabled. If the controller 228 determines in step S11 that this heating condition has not occurred and that the fuel flow is not enabled, the controller 228 then determines in step S112 whether at least one of the fuel flow block valve 220, the low flow bypass block valve 224 and the heating bypass block valve 242 is open. If it is determined in S12 that at least one of the valves 220, 224 and 242 is open, then the controller 228 proceeds to step S13 causing these open valves to close and continues the heat up process in a step S13A. If, however, it is determined in step S12 that all of the valves 220, 224 and 242 are closed, then the controller 228 maintains these valves in the closed state in step S14 and then continues the heat up process in a step S14A.

Referring now back to step S111, if the controller 228 determines in S11 that the fuel flow to the system 200 is enabled, then the operation of the controller 228 proceeds to step S115 in which the controller determines whether the temperature in the oxidizing catalyst 231 (and therefore the anode oxidizing assembly 230 and fuel cell 210), is within the predetermined temperature range, i.e., has the temperature exceeded the upper limit of this range. If it is determined in step S15 that the temperature of the oxidizing catalyst 231 has not exceeded the upper limit of the predetermined temperature range, the operation of the controller 228 proceeds to step S16 in which the controller 228 causes the low flow bypass block valve 224 to open, or maintains the low flow bypass block valve 224 in the open state, and causes the fuel flow control block valve 220 and the heating bypass block valve 242 to close, and/or maintains the block valve 220 and/or the heating bypass block valve 242 in the closed state. By performing step S16, the controller 228 causes the fuel to be directed through the low flow bypass assembly 201, i.e., along the low flow bypass line 222 through the low flow bypass block valve 224, and around the fuel flow block valve 220. Thus, the operation of the controller 228 in step S16 limits the fuel flow rate of the fuel passing through the variable fuel flow control valve 218 to a predetermined rate determined by the limiting part 216, as in the system of FIG. 1.

Referring now back to step S15, if the controller 228 determines in step S15 that the temperature in the oxidizing catalyst 231 exceeds the upper limit of the predetermined temperature range, then the controller 228 causes the low flow bypass block valve 224 to close, or maintains the valve 224 in the closed state, in step S17, such that no fuel can be passed through the low flow bypass assembly 201. At the same time, the first fuel flow block valve 220 is opened or maintained open so that fuel continues to the fuel cell. The controlling operation of the controller 228 then continues the fuel enabling and power production in a step S17A. The controller in a step S18 then determines whether the fuel cell 210 is operating at a power level greater than the predetermined power level. If the controller determines in step S118 that the power level is equal to or less than the predetermined power level value, then the controller 228 proceeds to step S19 in which it closes the heating bypass block valve 242, or maintains the valve 242 in the closed state, maintains the low flow bypass block valve 224 in the closed state and opens the fuel flow block valve 220, or maintains the fuel flow block valve 220 in the open state, such that the fuel passes along the fuel supply line 205 to the heating unit 206 and no fuel passes through the heating bypass assembly 241 or through the low flow bypass assembly 201. If, however, the controller 228 determines in step S18 that the power level is greater than the predetermined power level, such that high power operation of the fuel cell is occurring, then the controller operation proceeds to step S20 to maintain the fuel flow block valve 220 open, to maintain the low flow bypass block valve 224 closed, and to open the heating bypass block valve 242, or maintain the valve 242 in the open state. The operation of the controller in step S20 causes part or all of the fuel to be directed through the heating bypass line 244 and through the heating bypass block valve 242 of the heating bypass assembly 241, thereby bypassing the fuel heating unit 206.

The fuel cell system 200 shown in FIG. 3 and the operation of which is shown in FIG. 4, provides accurate control of fuel flow rates so as to avoid the formation of an ignitable fuel mixture in the anode exhaust gas by employing the low flow bypass assembly 201. The fuel cell system 200 of FIG. 3 and its operation shown in FIG. 4, also at high power levels allows for precise control of the temperature of the fuel flowing into the fuel processing assembly 208 by employing the heating bypass assembly 241.

It should be noted that the controllers 128 and 228 used in the embodiments of FIGS. 1 and 3 can be conventional PLCs (programmable logic controllers—essentially highly reliable robust computers) made by GE. The control program used for the embodiments, in turn, can be a software product called "Versapro" again a GE product implementable in GE PLCs for industrial automation.

In all cases it is understood that the above-described arrangements are merely illustrative of the many possible specific embodiments, which represent applications of the present invention. For example, as mentioned above the controller 128 or 228, or a separate controller not shown in FIGS. 1 and 3, may be employed to control the supply of input oxidant gas to the oxidizing assembly 130, 230 to provide sufficient oxidant gas so as to avoid formation of a potentially ignitable mixture. Numerous and varied other arrangements can be readily devised in accordance with the principles of the present invention without departing from the spirit and the scope of the invention.

What is claimed is:

1. A fuel cell system comprising:
    a fuel cell having an anode adapted to receive fuel and a cathode adapted to receive oxidant;
    an anode oxidizing assembly receiving output of said anode and input oxidant and reacting said input oxidant with said output of said anode to output oxidant gas for said cathode;
    a fuel supply assembly including a first fuel flow control part, said fuel supply assembly being adapted to supply fuel to said anode at a flow rate that is equal to or less than a first flow rate;
    a temperature sensor for sensing temperature in the anode oxidizing assembly;
    a low flow bypass assembly for directing fuel supplied by said fuel supply part to bypass said first fuel flow control part and to flow through said low flow bypass assembly, wherein the low flow bypass assembly limits the flow rate of fuel to a second flow rate smaller than said first flow rate;
    a control assembly for controlling the flow of fuel supplied by the fuel supply part through one of the fuel supply assembly and the low flow bypass assembly based on the temperature in the anode oxidizing assembly sensed by the temperature sensor,
    wherein the control assembly determines, based on the temperature sensed by the temperature sensor, whether the temperature in the anode oxidizing assembly is within a predetermined temperature range and, if said control assembly determines that the temperature in the anode oxidizing assembly is within the predetermined temperature range, the control assembly directs the flow of fuel through the low flow bypass assembly.

2. A fuel cell system in accordance with claim 1, wherein said fuel supply assembly includes a supply line, said first fuel flow control part controlling the flow of fuel through said supply line, and wherein said low flow bypass assembly includes a bypass line, having a first end coupled with said fuel supply line upstream from said first fuel flow control part and a second end coupled with said fuel supply line downstream from said first fuel flow control part, and a low flow bypass control part for controlling the flow of fuel through said bypass line.

3. A fuel cell system in accordance with claim 2, wherein said low flow bypass assembly further comprises a flow limiting part for limiting the fuel flow rate to said second flow rate, said flow limiting part being disposed downstream from said low flow bypass control part.

4. A fuel cell system in accordance with claim 3, wherein said first flow rate is about 55 scfm, said second flow rate is about 4 scfm and said predetermined temperature range in said anode oxidizing assembly is 700 to 1,000 degrees F.

5. A fuel cell system in accordance with claim 3, wherein said first fuel flow control part is closed and said low flow bypass control part is open when the temperature in said oxidizing assembly is within the predetermined temperature range and said first fuel flow control part is open and said low flow bypass control part is closed when the temperature in said oxidizing assembly is greater than the predetermined temperature range.

6. A fuel cell system in accordance with claim 5, wherein said oxidizing assembly includes an oxidizing catalyst for oxidizing said anode output and said input oxidant received by said oxidizing assembly, said temperature sensor senses the temperature in said oxidizing catalyst.

7. A fuel cell system in accordance with claim 6, wherein said predetermined temperature range is 700 to 1,000 degrees F.

8. A fuel cell system in accordance with claim 6, wherein said fuel supply assembly further includes a second fuel flow control part for controlling supply of fuel to said fuel cell system, said second fuel flow control part being upstream from said first end of said low flow bypass line.

9. A fuel cell system in accordance with claim 8, wherein said control assembly controls the opening and closing of said first and second fuel flow control parts and the opening and closing of said bypass control part.

10. A fuel cell system in accordance with claim 8, wherein said first fuel flow control part is a block solenoid valve and said low flow bypass control part is a block solenoid valve.

11. A fuel cell system in accordance with claim 8, further comprising a heating unit for heating said fuel to a pre-selected temperature, said heating unit being adapted to receive the fuel from said supply line and to output heated fuel for said anode.

12. A fuel cell system in accordance with claim 11, further comprising a fuel processing assembly adapted to receive said heated fuel from said heating unit via a second supply line, to process said heated fuel and to output said processed fuel for said anode.

13. A fuel cell system in accordance with claim 12, wherein said control assembly controls the opening and closing of said first and second fuel flow control parts and the opening and closing of said bypass control part.

14. A fuel cell system in accordance with claim 1, further comprising:
a heating unit for heating said fuel to a pre-selected temperature, said heating unit being adapted to receive the fuel from said supply line and to output heated fuel to a further supply line for said anode; and
a heating bypass assembly which, upon the occurrence of at least second and third conditions of said fuel cell system, causes part or all of the fuel being supplied by said fuel supply assembly to bypass said first fuel flow control part and said heating unit and to flow through said heating bypass assembly for supply to said anode.

15. A fuel cell system in accordance with claim 14, wherein said control assembly is responsive to said second and third conditions of said fuel cell system and controls said heating bypass assembly.

16. A fuel cell system in accordance with claim 15, wherein:
said second condition is when said temperature in said oxidizing assembly is greater than the upper limit of said predetermined temperature range; and
said third condition is when said fuel cell is operating at a power level greater than a predetermined power level.

17. A fuel cell system in accordance with claim 14, wherein:
said second condition is when said temperature in said oxidizing assembly is greater than the upper limit of said predetermined temperature range; and
said third condition is when said fuel cell is operating at a power level greater than a predetermined power level.

18. A fuel cell system in accordance with claim 17, wherein said heating assembly comprises: a heating bypass line, having a first end coupled with said supply line upstream from said first fuel flow control part and a second end coupled with said further supply line downstream from said heating unit; and a heating bypass control part for controlling fuel flow through said heating bypass line.

19. A fuel cell system in accordance with claim 18, further comprising a fuel processing assembly adapted to receive said heated fuel from said heating unit via said further supply line, to process said heated fuel and to output said processed fuel for said anode.

20. A fuel cell system in accordance with claim 18, wherein:
when the temperature in said oxidizing assembly is within the predetermined temperature range, said low flow bypass control part is open and said first fuel flow control part and said heating bypass control part are closed; and
when the temperature in said oxidizing assembly is greater than the upper limit of said predetermined temperature range and said fuel cell is operating at a power level greater than the predetermined power level, said heating bypass control part and said first fuel flow control part are open and said low flow bypass control part is closed.

21. A fuel cell system in accordance with claim 20, wherein said predetermined power level is 45Kw.

22. A fuel cell system in accordance with claim 21, wherein said predetermined temperature range is 700 to 1,000 degrees F.

23. A fuel cell system in accordance with claim 20, wherein said oxidizing assembly includes an oxidizing catalyst for oxidizing said anode output and said input oxidant received by said oxidizing assembly, said temperature in said oxidizing assembly is based on the temperature in said oxidizing catalyst.

24. A fuel cell system in accordance with claim 23, wherein said fuel supply assembly includes a supply line, said first fuel flow control part controlling the flow of fuel through said supply line, and wherein said low flow bypass assembly includes a bypass line, having a first end coupled with said fuel supply line upstream from said first fuel flow control part and a second end coupled with said fuel supply line downstream from said first fuel flow control part, and a low flow bypass control part for controlling the flow of fuel through said bypass line, and wherein said fuel supply assembly further includes a second fuel flow control part for controlling supply of fuel to said fuel cell system, said second fuel flow control part being upstream from said first end of said low flow bypass line.

25. A fuel cell system in accordance with claim 24, wherein said control assembly is responsive to said temperature in said oxidizing catalyst and to said power level of said fuel cell and controls the opening and closing of said first and second fuel flow control parts, the opening and closing of said bypass control part and the opening and closing of said heating bypass control part.

26. A fuel cell system in accordance with claim 25, wherein said first fuel flow control part is a block solenoid valve, said bypass flow control part is a block solenoid valve and said heating bypass control part is a block solenoid valve.

27. A method of operating a fuel cell system, the fuel cell system comprising: a fuel cell having an anode receiving fuel and a cathode receiving oxidant gas; an anode oxidizing assembly receiving output of said anode and input oxidant and outputting oxidant gas for said cathode; a fuel supply assembly including a first fuel flow control part, said fuel supply assembly being adapted to supply fuel to said anode at a flow rate that is equal to or less than a first flow rate; and a low flow bypass assembly; the method comprising:
detecting one or more conditions of said fuel cell system, including sensing temperature in the anode oxidizing assembly using a temperature sensor; and
controlling the flow of fuel supplied by the fuel supply part through one of the fuel supply assembly and the low flow bypass assembly based on the temperature in the anode oxidizing assembly sensed in said detecting step, wherein said controlling comprises:
determining, based on the temperature in the anode oxidizing assembly sensed in said detecting step, whether the temperature in the anode oxidizing assembly is within a predetermined temperature range, and if said determining determines that the temperature in the anode oxidizing assembly is within the predetermined temperature, directing fuel supplied by said fuel supply part to bypass said first fuel flow control part and flow through said low flow bypass assembly so as to limit the flow rate of fuel being supplied to a second flow rate smaller than said first flow rate.

28. A method in accordance with claim 27, wherein said temperature range is 700 to 1000 degrees F.

29. A method in accordance with claim 27, wherein said fuel supply assembly includes a supply line, said first fuel flow control part controlling the flow of fuel through said supply line, and wherein said low flow bypass assembly includes a bypass line, having a first end coupled with said fuel supply line upstream from said first fuel flow control part and a second end coupled with said fuel supply line downstream from said first fuel flow control part, and a low flow bypass control part for controlling the flow of fuel through said bypass line.

30. A method in accordance with claim 29, wherein said low flow bypass assembly further comprises a flow limiting part for limiting the fuel flow rate to said second flow rate, said flow limiting part being disposed downstream from said low flow bypass control part.

31. A method in accordance with claim 30, wherein said first flow rate is about 55 scfm, said second flow rate is about 4 scfm and said predetermined temperature range in said anode oxidizing assembly is 700 to 1,000 degrees F.

32. A method in accordance with claim 31, wherein: said step of causing causes said first fuel flow control part to be closed and said low flow bypass control part to be open when the temperature in said oxidizing assembly is within the predetermined temperature range and said first fuel flow control part to be open and said low flow bypass control part to be closed when the temperature in said oxidizing assembly is greater than the predetermined temperature range.

33. A method in accordance with claim 32, wherein said oxidizing assembly includes an oxidizing catalyst for oxidizing said anode output and said input oxidant received by said oxidizing assembly, said temperature sensor senses the temperature in said oxidizing catalyst.

34. A method in accordance with claim 33, wherein said predetermined temperature range is 700 to 1,000 degrees F.

35. A method in accordance with claim 33, wherein said fuel supply assembly further includes a second fuel flow control part for controlling supply of fuel to said fuel cell system, said second fuel flow control part being upstream from said first end of said low flow bypass line.

36. A method in accordance with claim 35, wherein: said step of controlling includes controlling the opening and closing of said first and second fuel flow control parts and the opening and closing of said bypass control part.

37. A method in accordance with claim 35, wherein said first fuel flow control part is a block solenoid valve and said low flow bypass control part is a block solenoid valve.

38. A method in accordance with claim 35, wherein said fuel cell system further comprises a heating unit for heating said fuel to a pre-selected temperature, said heating unit being adapted to receive the fuel from said supply line and to output heated fuel for said anode.

39. A method in accordance with claim 38, wherein said fuel cell system further comprises a fuel processing assembly adapted to receive said heated fuel from said heating unit via a second supply line, to process said heated fuel and to output said processed fuel for said anode.

40. A method in accordance with claim 39, wherein: said step of controlling comprises controlling the opening and closing of said first and second fuel flow control parts and the opening and closing of said bypass control part responsive to said temperature in said oxidizing catalyst.

41. A method in accordance with claim 27, wherein: said fuel cell system further comprises: a heating unit for heating said fuel to a pre-selected temperature, said heating unit being adapted to receive the fuel from said supply line and to output heated fuel to a further supply line for said anode; and a heating bypass assembly; and said method further comprising:
upon the detection of the occurrence of at least second and third conditions of said fuel cell system, further controlling part or all of the fuel being supplied by said fuel supply assembly to bypass said first fuel flow control part and said heating unit and to flow through said heating bypass assembly for supply to said anode.

42. A method in accordance with claim 41, wherein: said steps of controlling and further controlling include controlling said fuel supply assembly, said low flow bypass assembly and said heating bypass assembly based on determining in said determining step and responsive to said second and third conditions of said fuel cell system.

43. A method in accordance with claim 42, wherein: said second condition is when said temperature in said oxidizing assembly is greater than an upper limit of said predetermined temperature range; and
said third condition is when said fuel cell is operating at a power level greater than a predetermined power level.

44. A fuel cell system in accordance with claim 41, wherein:
said second condition is when said temperature in said oxidizing assembly greater than the upper limit of said predetermined temperature range; and
said third condition is when said fuel cell is operating at a power level greater than a predetermined power level.

45. A method in accordance with claim 44, wherein said heating assembly comprises: a heating bypass line, having a first end coupled with said supply line upstream from said first fuel flow control part and a second end coupled with said further supply line downstream from said heating unit; and a heating bypass control part for controlling fuel flow through said heating bypass line.

46. A method in accordance with claim 45, wherein said fuel cell system further comprises a fuel processing assembly adapted to receive said heated fuel from said heating unit via said further supply line, to process said heated fuel and to output said processed fuel for said anode.

47. A method in accordance with claim 45, wherein: said steps of controlling and further controlling include: when the temperature in said oxidizing assembly is within the predetermined temperature range, controlling said low flow bypass control part to be open and said first fuel flow control part and said heating bypass control part to be closed; and when the temperature in said oxidizing assembly is greater than the upper limit of the predetermined temperature range and said fuel cell is operating at a power level greater than the predetermined power level, controlling said heating bypass control part to be open and said low flow bypass control part to be closed.

48. A method in accordance with claim 47, wherein said predetermined power level is 45Kw.

49. A method in accordance with claim 48, wherein said predetermined temperature range is 700 to 1,000 degrees F.

50. A method in accordance with claim 47, wherein said oxidizing assembly includes an oxidizing catalyst for oxidizing said anode output and said input oxidant received by said oxidizing assembly, said temperature sensor senses the temperature in said oxidizing catalyst.

51. A method in accordance with claim 50, wherein said fuel supply assembly includes a supply line, said first fuel flow control part controlling the flow of fuel through said supply line, and wherein said low flow bypass assembly includes a bypass line, having a first end coupled with said fuel supply line upstream from said first fuel flow control part and a second end coupled with said fuel supply line downstream from said first fuel flow control part, and a low flow bypass control part for controlling the flow of fuel through said bypass line, and wherein said fuel supply assembly further includes a second fuel flow control part for controlling supply of fuel to said fuel cell system, said second fuel flow control part being upstream from said first end of said low flow bypass line.

52. A method in accordance with claim 51, wherein:
said steps of controlling and further controlling include controlling the opening and closing of said first and second fuel flow control parts, the opening and closing of said bypass control part and the opening and closing of said heating bypass control part based on determining in said determining step and responsive to said power level of said fuel cell.

53. A method in accordance with claim 52, wherein said first fuel flow control part is a block solenoid valve, said bypass flow control part is a block solenoid valve and said heating bypass control part is a block solenoid valve.

54. A programmed computer controller for carrying out the method of claim 27.

55. A programmed computer controller for carrying out the method of claim 41.

56. A program on a computer readable medium for execution by a computer controller to execute the steps of the method of claim 27.

57. A program on a computer readable medium for execution by a computer controller to execute the steps of the method of claim 41.

* * * * *

UNITED STATES PATENT AND TRADEMARK OFFICE
CERTIFICATE OF CORRECTION

PATENT NO. : 7,939,215 B2  Page 1 of 1
APPLICATION NO. : 11/404551
DATED : May 10, 2011
INVENTOR(S) : Fred C. Jahnke et al.

It is certified that error appears in the above-identified patent and that said Letters Patent is hereby corrected as shown below:

On the title page, item should read:
(73) Assignee: FuelCell Energy, Inc., Danbury, CT (US)

Signed and Sealed this
Fifth Day of July, 2011

David J. Kappos
*Director of the United States Patent and Trademark Office*